Jan. 25, 1938.  J. LEDWINKA  2,106,677
VEHICLE BODY CONSTRUCTION
Filed Jan. 31, 1935
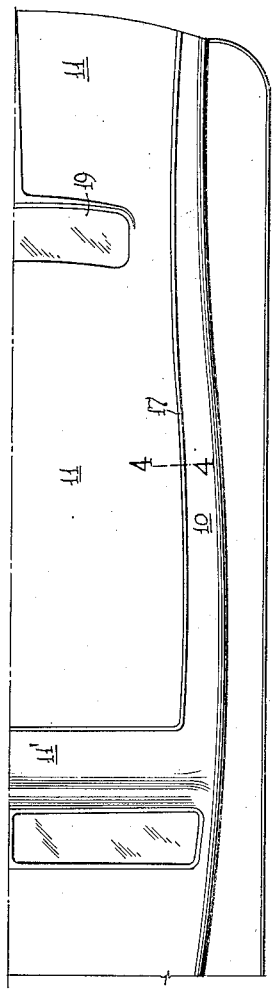
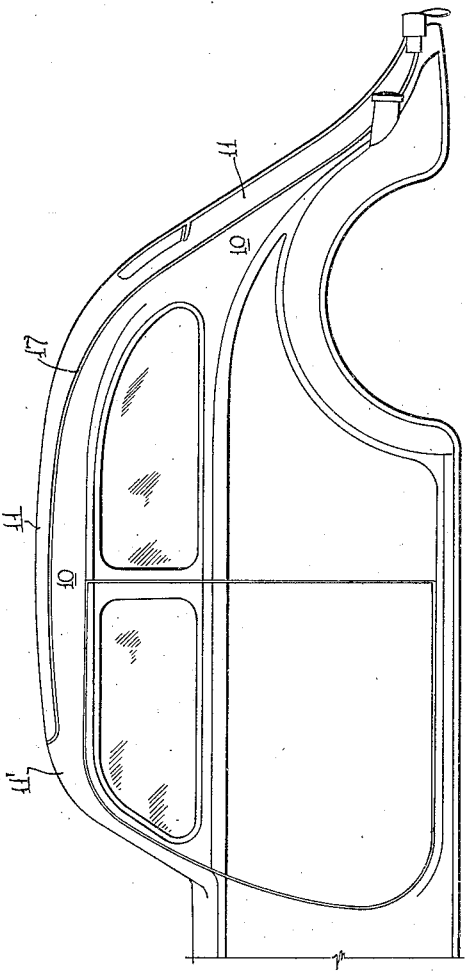
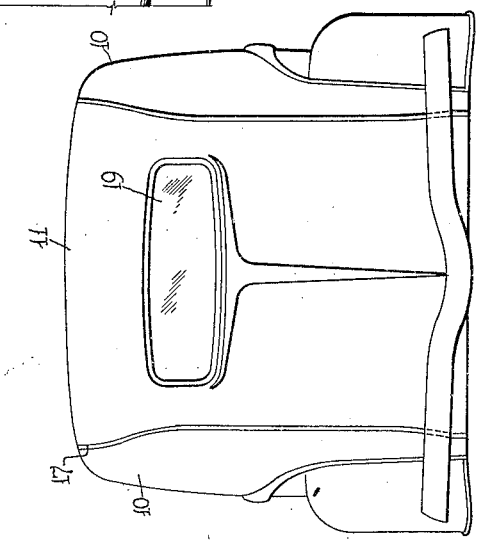
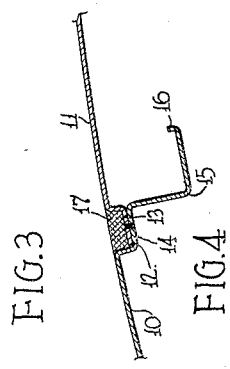
INVENTOR.
JOSEPH LEDWINKA.
BY
*John P. Barbox*
ATTORNEY.

Patented Jan. 25, 1938

2,106,677

UNITED STATES PATENT OFFICE 2,106,677

VEHICLE BODY CONSTRUCTION

Joseph Ledwinka, Philadelphia, Pa., assignor to Edward G. Budd Manufacturing Company, Philadelphia, Pa., a corporation of Pennsylvania Application January 31, 1935, Serial No. 4,256

1 Claim. (Cl. 296—137)

The invention relates to roof construction for vehicle bodies and particularly to the roof construction of such bodies as have the rear portions of the roof sweep downwardly and rearwardly in streamline form.

My invention relates particularly to vehicle bodies made of sheet metal and among the objects of the invention are to so divide the unit panels entering into the roof construction as to simplify their fabrication and final assembly and to provide a final assembly joint which adds materially to the strength of the roof structure.

These objects are attained according to the present invention by fabricating the side quarters of the roof from the front to the rear end of the body as integral portions of the side panel stampings, and forming the central portion of the roof including the rearward and downwardly sweeping rear end as a single stamping roof panel, the side quarter panels and the central panel being formed in their adjoining margins with final assembly joints extending continuously from the front to the rear end of the body. These final assembly joints are reinforced by angular formations which provide in the final assembly a longitudinally bowed beam structure strongly reinforcing the roof section of the body from front to rear. The final assembly joint between the side and center roof panels also permits their ready joinder by spot welding and adequate and easily applied weather-proofing and, when finally joined, the side and central portions of the roof merge smoothly into each other and when the paint is applied to the body present the appearance of a jointless roof and rear wall extending from side to side.

In the drawing,

Fig. 1 is a side elevation of an automobile body embodying the invention the extreme forward end being broken away.

Fig. 2 is a plan view of the left hand half of the body shown in Fig. 1.

Fig. 3 is a rear end elevation.

Fig. 4 is one form of joint between the center and side panels being a section taken on the line 4—4 of Fig. 2, and Fig. 5 is another form of joint and shows the central panel made of a laminated sound-deadening construction.

In the drawing, the side quarters of the metal roof construction forming, in this instance, integral parts of the side panel stampings are designated by the numeral 10 and extend from the windshield through the relatively longitudinally flat portion of the roof and then sweep downwardly and rearwardly to the rear end of the body in conformity with the streamline conformation of the rear end of the body.

Between the curved side quarters 10 of the roof forming parts of the side body sub-assemblies, there is provided a transversely relatively flat sheet metal roof panel 11, which also extends continuously from the top windshield header 11' rearwardly and then rearwardly and downwardly to the rear end of the body. This panel is made preferably as a single sheet metal panel and may be made as shown in Fig. 4 out of a single thickness sheet or as shown in Fig. 5 out of a laminated sound-deadening sheet of substantially the same gauge as the single thickness sheet. The central panel 11 may include within its area, as shown, the rear window opening 19.

By this construction, it will be seen that the sides of the roof at the longitudinally relatively flat top as well as the inclined rear end may be simply fabricated out of three stampings.

The margins of these stampings are formed to provide final assembly joints which facilitate the bringing of the parts in final assembled relation and their ready joinder to each other. These final assembly joints are so formed as to permit their easy fabrication and to provide a strong bowed beam construction strengthening the roof and rear body longitudinally from end to end.

To this end, according to a preferred form of final assembly joint the inner margin of a side quarter panel 10 is formed with a rabbet at 12 to receive the downwardly offset margin 13 of the central panel 11. The margin 13 of the central panel in the final assembly overlaps the horizontal wall 14 of the rabbet 12 and is secured thereto by spot welding. The rabbet 12 and offset 13 form between them a channel section which forms a longitudinal strengthening member at both sides of the roof and for its whole length extending from the windshield in arched formation to the rear end of the body. Additional strength is afforded in this region by an angular extension 15 from the rabbet 13 of the quarter panel 10, the extreme margin of this angular extension being formed with a short upwardly extending flange 16. The laterally extending flange of the angular extension 15 also provides means for securing transverse roof braces, if desired, and also the head lining of the trim. A water-tight seal is assured and is readily obtained by filling the upwardly facing channel with solder 17, which can be readily cleaned off smooth with the outer faces of the panels 10 and 11 as indicated in Fig. 4. After the solder is applied and cleaned off a continuous smooth metal surface is attained and after the paint is applied the entire roof including the inclined rear end of the body presents the appearance of a jointless metal roof arched transversely and longitudinally.

According to a modification of the invention as shown in Fig. 5, the central panel 11 may be comprised of a sound-deadening laminated sheet comprised of two thin metal sheets cemented together by an elastic cement, the flanged edge 18 of which is, however, left free of cement so that it can be secured, as shown, to the vertically extending arm of the angular extension 15, by spot welding, as shown. In this modification each of the joined panels 10 and 11 is formed with a shallow rabbet, which together form the channel for receiving the sealing filler of solder, as 17. It is obvious that a laminated central panel could be used and joined in the manner shown in Fig. 4.

The front of the roof panel 11 may be joined to the windshield 11' by either of the methods of joinder shown in Figs. 4 and 5 or any other known methods of joinder.

From the foregoing it will be seen that a very easily fabricated and joined roof construction is provided and a strong longitudinal reinforcement in the form of a curved beam is provided along the lines of joinder by reason of the formation of these panels at the joint and their integral joinder by spot welding.

What I claim is:

In a metal vehicle body construction having two side panel stampings including the side quarters of the roof and of the rearwardly and downwardly inclined rear wall, and a central unitary sheet metal stamping extending transversely the greater portion of the roof and from adjacent the windshield rearwardly over the relatively flat portion of the roof and sweeping downwardly at the rear through a downwardly and rearwardly inclined portion to the rear, the improvement comprising a final assembly joint between said stampings wherein said stampings are formed in their margins with downwardly offset portions adapted to overlap and spot welded together in said overlap to form an outwardly facing channel, a metallic weather sealing material filling said channel flush with the face of the stampings whereby the joint becomes invisible after painting, one of said stampings being further inwardly extended beyond said overlap to provide an inward continuous extension of angular cross section, whereby the joint serves as a longitudinally arched stiffening beam extending continuously from adjacent the windshield through the roof and rear walls.

JOSEPH LEDWINKA.